United States Patent [19]
Merlen

[11] 3,980,893
[45] Sept. 14, 1976

[54] ALIGNMENT MEANS FOR A FLAW DETECTION SYSTEM EMPLOYING A LIGHT COLLECTOR ROD

[75] Inventor: Monty M. Merlen, Stamford, Conn.

[73] Assignee: Intec Corporation, Norwalk, Conn.

[22] Filed: May 29, 1975

[21] Appl. No.: 581,806

[52] U.S. Cl. .............................. 250/572; 250/227; 356/172
[51] Int. Cl.² ........................................ G01N 21/32
[58] Field of Search ............ 356/172, 154; 250/562, 250/563, 561, 227, 571, 572

[56] References Cited
UNITED STATES PATENTS

| | | |
|---|---|---|
| 3,471,241 | 10/1969 | Hendrixson et al. ............... 356/172 |
| 3,565,530 | 2/1971 | Boissevain et al. ................. 356/154 |
| 3,737,238 | 6/1973 | Reiner et al. ....................... 356/172 |
| 3,775,011 | 11/1973 | Marsh ................................. 356/172 |
| 3,866,054 | 2/1975 | Wolf ................................... 250/562 |

Primary Examiner—David C. Nelms
Attorney, Agent, or Firm—Joseph Levinson

[57] ABSTRACT

An alignment means is provided for aligning a light collector rod with a scanning light beam in a flaw detection system. The light collector rod means, having a diffusing or reflective stripe thereon, is positioned to receive light from a material being examined which is being scanned by a light beam. In order to align the light collector rod with the scanning light beam, an alignment light source is positioned on the side opposite to the stripe on which light is received from the material, and the alignment light source is selectively actuated to project a dark stripe or line from the light collector rod means on the material being examined so that the scanning light beam can be aligned with the line projected thereon.

1 Claim, 2 Drawing Figures

ALIGNMENT MEANS FOR A FLAW DETECTION SYSTEM EMPLOYING A LIGHT COLLECTOR ROD

BACKGROUND OF THE INVENTION

This invention relates to a flaw detection system, and more particularly to a flaw detection system of the type which utilizes a light collector rod means for applying light from the material being examined to a suitable detector. This invention is more particularly concerned with the means for aligning the light collector rod means with the scanning light beam of the flaw detection system.

Flaw detection systems have been developed in which a light source is successively scanned across a web or sheet of moving material being examined, in order to determine if any flaws exist therein. The light applied to the material is either transmitted, reflected, or scattered, and if a detector is employed to detect such radiation, any change from the normal pattern of reflected, transmitted, or scattered light is one means of determining whether a flaw exists in the material. In order for the system to function properly, the scanning light beam must be continually imaged on the detector as the light beam scans the material, so the variations in the light pattern may be picked up and detected by the detector. Improper alignment would defeat the purpose of the system. In systems such as that shown and described in patent application Ser. No. 449,247, filed Mar. 8, 1974, now U.S. Pat. No. 3,900,625, a folddown optical mirror and light source is utilized for providing the alignment function. This alignment means is perfectly adequate for the type of receiver which is shown in the aforesaid application. However, in the case where a light collecting rod is utilized which is wider than the material being examined, e.g. such as shown in U.S. Pat. No. 3,866,054, a simple folded optical arrangement cannot be feasibly implemented. Accordingly, means must be provided for aligning the long light-collecting means positioned adjacent to the material so that the light collecting rod is in alignment with the scanning light beam in order that light variations along the material may be collected along the entire width of material to provide flaw signal information.

OBJECTS AND SUMMARY OF THE INVENTION

Accordingly, it is an object of this invention to provide a new and novel alignment means for a flaw detection system which is suitable for use in a system which employs a light collecting rod of extended length.

A further object of this invention is to provide a new and novel alignment means for a flaw detection system employing a light collector rod which is simple, easy to operate, and provides an easy method for aligning a scanning light source with a light collector rod over a considerable distance.

In carrying out this invention in one illustrative embodiment thereof, a flaw detection system is provided which employs a light collector rod means which extends at least the width of the material being examined by a scanning light beam. The light collector rod is provided with a diffusing or reflective stripe for collecting light which is received from the surface of the material being scanned by the scanning light source and applied to a detector for providing flaw signals from the material being examined. An alignment light source is positioned such that the light collector rod with stripe thereon is positioned between the alignment light source and the surface of the material being examined so that when the alignment light source is actuated, the diffusing or reflective stripe on the light collector rod means is projected on the surface of the material, forming a line thereon, which makes aligning with the scanning light beam an easy matter.

DESCRIPTION OF THE PREFERRED EMBODIMENTS

Figure 1:
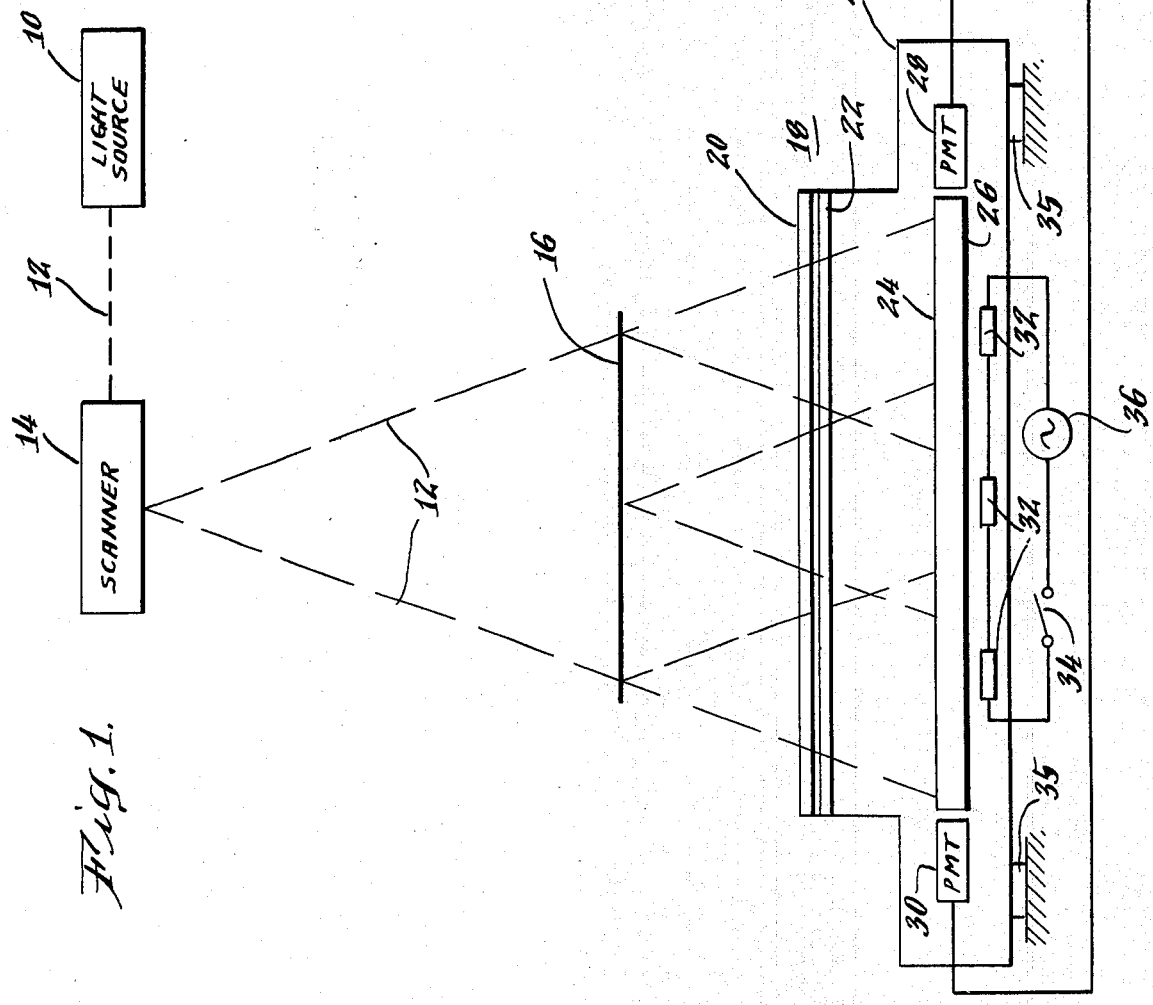
FIG. 1 is a schematic diagram, partly in block form, illustrating a flaw detection system having an alignment means of the type embodied in the present invention.

Referring now to FIG. 1, the flaw detection system consists of a light source 10 which may be in any suitable form such as a laser generating a light beam 12 which is scanned by a scanner 14 over a material 16 which is being examined for flaws. The light beam 12, when applied to the material 16, is either transmitted, reflected, or scattered in accordance with the material being examined. As shown in FIG. 1, a transmissive system is utilized in which flaws are detected based on the transmission properties of the material 16. It will be appreciated that a reflective system may also be utilized and the type of system employed will depend on the type of material being examined. An optical means 18 comprising cylindrical lenses 20 and 22 are positioned with respect to the material 16 to image the light passed thereby onto a light collector rod means 24. The light collector rod 24 may consist of glass or a suitable plastic, such as acrylic, which has a diffuse reflecting strip 26 on the bottom side thereof. This stripe may be painted, attached, or otherwise applied to the light collecting rod 24, whose function is to diffuse or collect the light passing through the material 16 and apply it to the stripe by the optical means 18 so that the light applied thereto is reflected by internal reflection and passed down the rod 24 to either end, where it is applied to a suitable detector or detectors 28 and 30, e.g. photomultiplier tubes. It will be apparent that only one detector at one end of rod 24 is required when the other end is made reflective. The outputs of the detectors 28 and 30 are applied to a flaw discriminator 40 which produces flaw signal outputs thereof when the signals applied to the flaw discriminator exceed a predetermined amplitude or otherwise pass the requirements of the flaw discriminator 40.

Positioned under the light collection rod 24 opposite the stripe 26 thereon is a suitable light source 32 which may be in the form of a single or a plurality of fluorescent bulbs which are shown connected in series, for purposes of illustration, and actuated by closing a switch 34 which applies a source of power 36 to the light sources 32. It will be apparent that a single fluorescent bulb may be utilized, or that a plurality of smaller bulbs may be employed, as is desired. A plurality of smaller bulbs spaced on the under side of the rod 24 are deemed preferable because of the simplified mounting and ease of service access.

Figure 2:
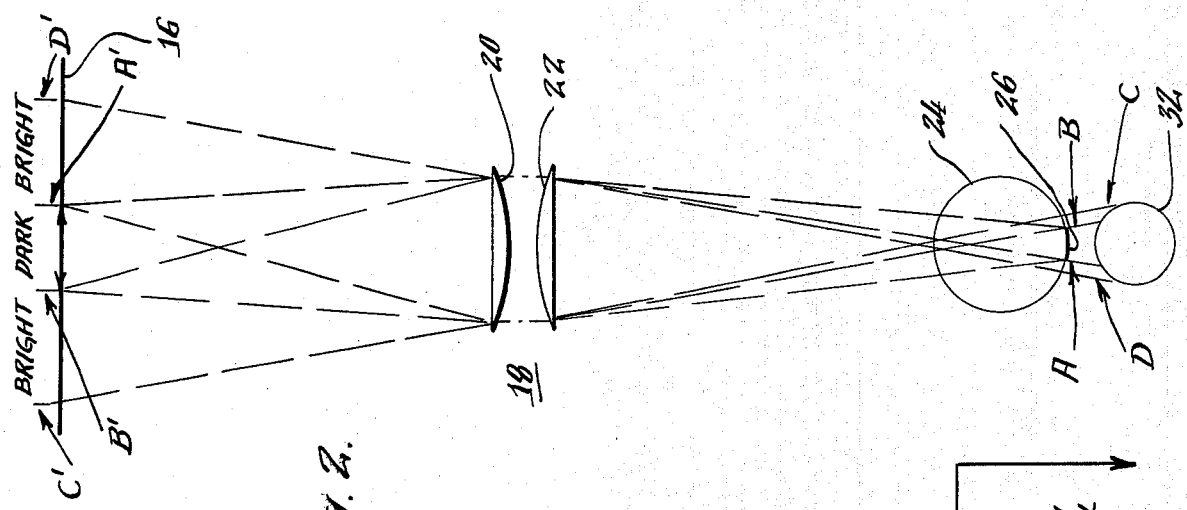
FIG. 2 is an enlarged side elevational view of the alignment light source, light collector rod means, and optical means shown in FIG. 1 to illustrate the operation of the alignment means embodied in this invention.

As has already been stated, one of the problems in using a light collector rod 24 resides in aligning the system such that the light beam 12 from the scanner 14 scans the material 16 and is imaged properly along the entire length of the light collector rod 24. In accordance with the present invention this alignment is provided by actuating the switch 34 which turns on the alignment light source 32. As will best be seen in FIG. 2, the illuminating of the alignment source 32 applies light to the light collector rod 24 on the under side thereof. Light rays A and B from the alignment source 32 project the diffuse stripe 36 through the optical means 18 onto the under side of the material 16, producing a dark line thereon, identified as A'-B' which corresponds to the stripe 26 on the bottom of the light collector rod 24. Light rays C and D are projected to produce bright bands B'-C' and A'-D' around the projected dark band A'-B' on the material 16. Accordingly, a dark area A'-B' whose width corresponds to the stripe 26 on the light collecting rod 24 is projected on the material 16, thereby making is easy for aligning the light beam 12 on the dark stripe across the material 16. Any suitable mounting means may be provided, for example in FIG. 1 the optical means 18, the light collector rod 24, and the detectors 28 and 30 may all be mounted in a unitary housing 25 which may be adjustably mounted on adjustable blocks 35 of any suitable type which will produce rotational and/or translational motion between the housing 25 and the scanner 14. Also, of course, the scanner 14 may be moved in position so that proper alignment may be achieved. It makes no difference whether a long single line is provided by a single source alignment means 32 or a plurality of sources spaced therealong which will present on the material 16 a continuous dashed line. All that is necessary in alignment is to provide the beam 12 to scan across the center of the dark stripe produced by the projection of stripe 26 on the material 16. When the alignment has taken place, the alignment source 22 is deactivated by disengaging the switch 34, and the system is ready for scanning the material 16 and examining such material for flaws.

The simple means for projecting a dark line on the material and scanning that line with the scanning beam for alignment purposes constitutes a very simple and easily implemented way of aligning a long light collecting rod in a flaw detecting system without materially altering the receiver optical system. The alignment procedure is simple and quickly performed, and may be checked periodically merely with the flick of a switch.

Since other modifications and changes, varied to fit particular operating requirements and environments, will be apparent to those skilled in the art, the invention is not considered limited to the examples chosen for purposes of illustration, and covers all changes and modifications which do not constitute departures from the true spirit and scope of this invention.

I claim:

1. An alignment means for aligning a light collector rod with a scanning light beam in a flaw detection system comprising, in combination,
  a. means for producing a light beam,
  b. means for scanning said light beam over a material which is being examined for flaws,
  c. light collector rod means having a diffusing stripe thereon positioned to receive light from the material being examined,
  d. optical means for applying light from said material onto said diffusing stripe,
  e. an alignment light source positioned on the opposite side of said stripe from the side from which light is applied to said stripe by said optical means from said material,
  f. means for selectively actuating said alignment light source whereby said alignment light source when actuated applies light from said alignment light source to said stripe which stripe is projected by said optical means onto said material in the form of a dark line for aligning the light collector rod means and said light beam.

* * * * *